Nov. 29, 1966 I. EZOPOV 3,288,362

SLIDE RULE OF CIRCULAR TYPE, SET FOR EQUATIONS

Filed June 9, 1965 2 Sheets-Sheet 1

INVENTOR
Igor Ezopov

SLIDE RULE OF CIRCULAR TYPE, SET FOR EQUATIONS

Filed June 9, 1965 2 Sheets-Sheet 2

INVENTOR

Igor Ezopov

United States Patent Office 3,288,362

Patented Nov. 29, 1966

3,288,362

SLIDE RULE OF CIRCULAR TYPE, SET FOR EQUATIONS

Igor Ezopov, 336 Union Ave., Brooklyn, N.Y.

Filed June 9, 1965, Ser. No. 462,514

2 Claims. (Cl. 235—84)

This invention relates to slide rules for performing mathematical functions to obtain a more accurate solution than what was previously possible in conventional slide rules, and more specifically is an improvement over slide rules of the type disclosed in the United States Patent No. 3,071,321.

At the present time, slide rules, either straight line or circular, can solve only simpler problems of quadratic and cubic equations, being not capable of solving polyniomial equations in $x$ of higher degree.

Accordingly, it is an object of this invention to provide a circular rule of simple construction that is accurate and can be used with facility for various polynomials in $x$, finding real and imaginary roots and solving given equations.

Another object of this invention is to provide a slide rule by means of which a given equation of higher degree can be transformed into another equation of lower degree, defining coefficient for every new term.

A further object of this invention is to provide a slide rule carrying out separate calculation for every term of equation on base of ordinary value of $x$ for every term, while other values, as $x^2$ and $x^3$, for example, are obtained automatically on account of special combination of ordinary, square and cubic scales.

Still another object of this invention is to provide a slide rule for simultaneous observation of calculation for every term of equation for given root and for synchronous rotation of corresponding disks to avoid errors which can occur in rotation every disc separately.

Still further object of this invention is to provide a slide rule for solution equations of Pythagorian type known as $R^2=a^2+b^2$ and applicable in calculation of imaginary roots or sides of a right-angle triangle, even avoiding squaring of numerical values.

Still further object of this invention is to provide a slide rule which by way of practical proof contributes to mathematics as for example in analyzing of equations of 5 and higher degrees, in solution of equations for imaginary roots and in carrying out four basic mathematical operations on the same pair of logarithmic scales.

And still another object of this invention is to provide aforesaid slide rule which in addition of being accurate for solving equations, will be specifically adapted to utilize the advantages disclosed in the slide rule in Patent No. 3,071,321 of the same inventor.

These and other objects of the hereinbelow disclosed novel slide rule, will become apparent to those skilled in the art by referring to the following description taken together with the attached drawings. It is to be understood, however, that the drawings are for illustrative purposes only, and are not to be used as limiting the scope of this invention.

To facilitate the description of the invention it will be noted that a limited number of scales are shown in the attached drawings and will be described. This limitation, however, should not be construed as defining a limitation of the invention, inasmuch as the number of sets and scales can be varied in accordance with the desired degree and type of equation.

Figure 1:
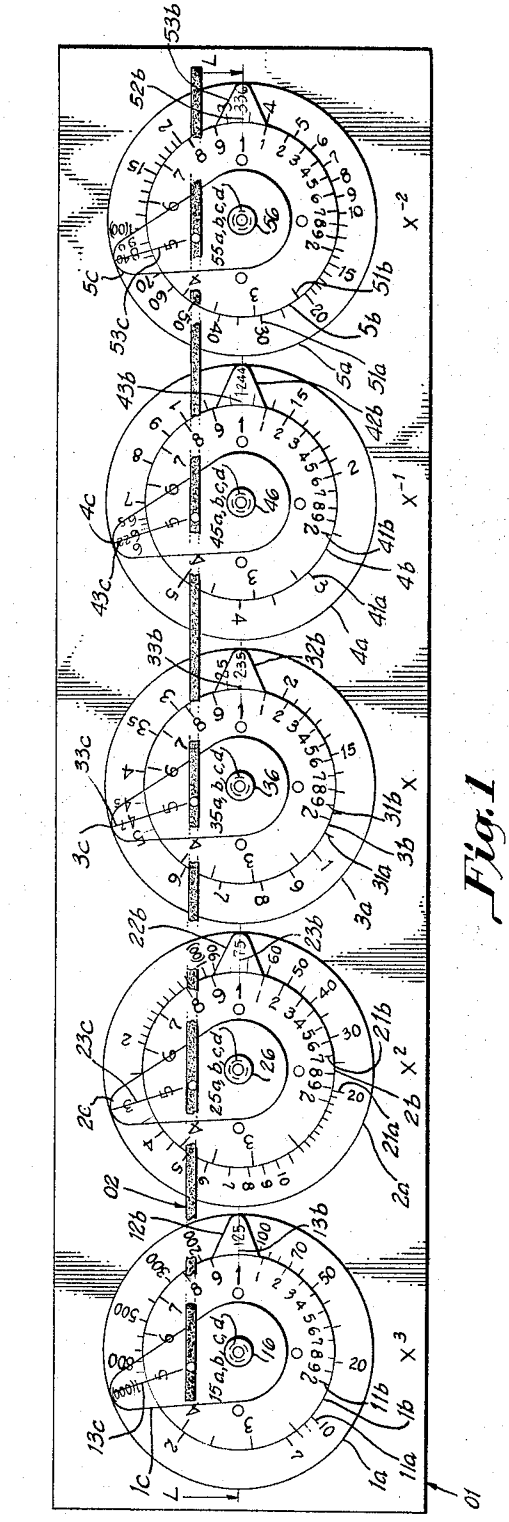
FIGURE 1 is a plan view of a circular slide rule, set for an equation that is construed in accordance with the invention.
Figure 3:
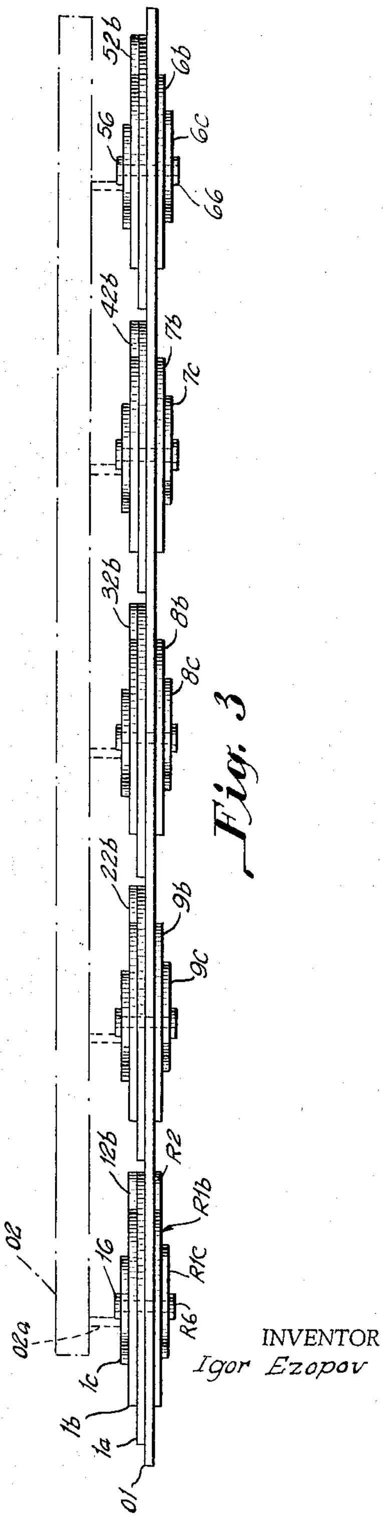
FIGURE 3 is an elevational view of the novel slide rule of FIGURE 1 and FIGURE 2.

Now referring to the drawings and specifically to the drawings FIGURE 1 and FIGURE 3, the novel slide rule as shown has five separate slide rules placed on the front side of plate 01. Each of these slide rules, which will be referred to as sets 1, 2, 3, 4 and 5, are provided for calculation of corresponding term of given equation comprising values of $x$ with different exponents: $x^3$, $x^2$, $x$, $x^{-1}$ and $x^{-2}$, as shown on said plate 01. Each set 1 . . . 5 of the novel slide rule is composed of three concentric discs, two of each "*a*" and "*b*" are for scales "*a*" and "*b*" and third "*c*" is provided mainly for aligning numbers on different scales and will be referred to as searcher disc "*c*." Every disc of a set together with plate 01 have aligned central openings 15*a*, *b*, *c*, *d*; 25*a*, *b*, *c*, *d*; 35*a*, *b*, *c*, *d*; 45*a*, *b*, *c*, *d*; and 55*a*, *b*, *c*, *d* and pivot-pins 16, 26, 36, 46 and 56 respectively which fasten said sets together and to common plate 01 and permit the rotation of discs relative to each other.

The discs "*a*" and "*b*" (1 . . . 5) progressively decrease in diameter, and are provided with periferal logarithmic scales 11*a*, *b*, 21*a*, *b*, 31*a*, *b*, 41*a*, *b* and 51*a*, *b* respectively. Scales 11*a*, 21*a* and 31*a*, *b*, are provided for multiplication and disposed in opposition to each other, whereas scales 41*a* and *b* and scales 51*a* and *b* are provided for division and disposed in the same direction. Each disc 1*b*, 2*b*, 3*b*, 4*b* and 5*b* has reading tab 12*b*, 22*b*, 32*b*, 42*b* and 52*b* respectively with corresponding reference hairline 13*b*, 23*b*, 33*b*, 43*b* and 53*b* which will be referred to as reading tabs.

The discs "*c*" have searcher tabs 12*c*, 22*c*, 32*c*, 42*c* and 52*c* with reference hairlines 12*c*, 23*c*, 33*c*, 43*c* and 53*c* respectively. Tabs "*c*" and "*b*" are transparent for reading numbers on scales "*a*" and "*b*." Each of discs "*c*" (1 . . . 5) is provided with a hole in radial direction of hairlines 13*c*, 23*c*, 33*c*, 43*c* and 53*c* respectively located on the same distance from corresponding centers. They are provided for synchronous rotation of all discs "*c*" (1 . . . 5) by means of a common bar 02 with five axes 02*a* located on the same distance one from other as corresponding holes in discs "*c*." Similarly discs "*b*" (1 . . . 5) have three holes each for synchronous rotation discs "*b*" by one other bar (not shown) similar to bar 02 for, selecting such a group of holes which will not interfere with operation of bar 02.

Figure 2:
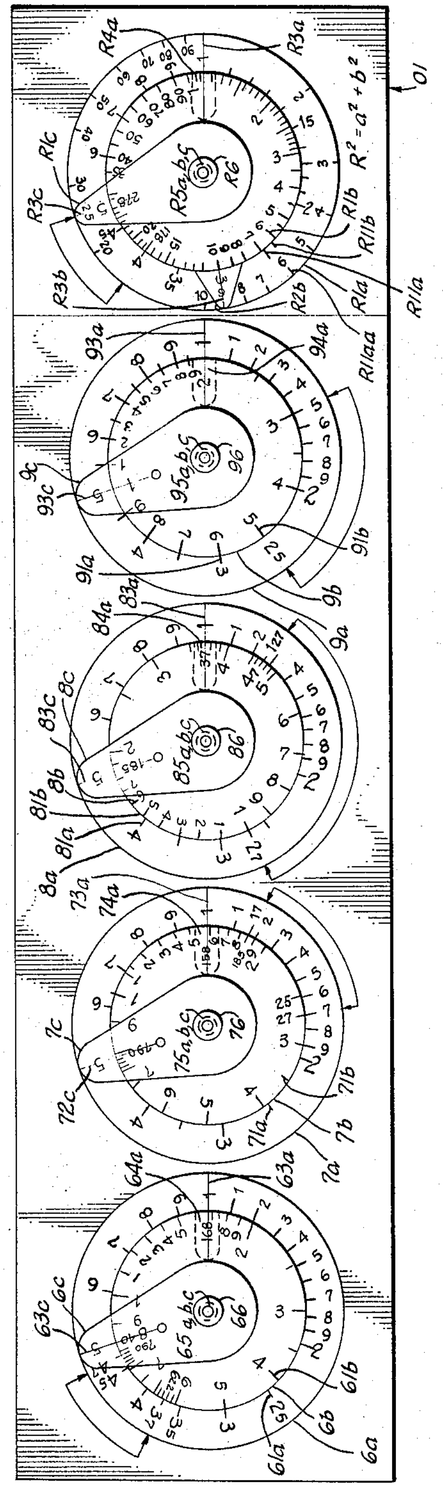
FIGURE 2 is the backside view of the novel slide rule of FIGURE 1.

Referring now to the drawings, FIGURES 2 and 3, the novel slide has other five separate slide rules, which will be referred to as sets 6, 7, 8, 9 and R placed on back side of common plate 01. Sets 6 . . . 9 each have two discs "*a*" and "*b*" with logarithmic scales 61*a*, *b*; 71*a*, *b*; 81*a*, *b* and 91*a*, *b* respectively. Discs "*a*" are not real movable discs but drawn pictures on plate 01 together with scales 61*a*, 71*a*, 81*a* and 91*a*, reference lines 63*a*, 73*a*, 83*a* and 93*a* and corresponding reference boxes 64*a*, 74*a*, 84*a* and 94*a*, which can be seen only through transparent disc "*b*" and searcher tabs "*c*." Searcher discs 6*c*, 7*c*, 8*c* and 9*c* have reference hairlines 63*c*, 73*c*, 83*c* and 93*c* respectively. Each of discs "*c*" is provided with a hole in radial direction of hairline "*c*" for their synchronous rotation by means of bar 02, using only 4 axes, or by a similar bar. All discs of a set (7 . . . 9) have aligned central openings 65*a*, *b*, *c*; 75*a*, *b*, *c*; 85*a*, *b*, *c* and 95*a*, *b*, *c* and pivot-pins 66, 76, 86, and 96 respectively. Openings 65*c*, 75*c*, 85*c* and 95*c* coincide with plate openings 55*d*, 45*d*, 35*d* and 25*d* respectively, while pivot-pins 66, 76, 86 and 96 are continuations of pivot-pins 56, 46, 36 and 26 respectively, as shown.

Two arrows at each set 6, 7, 8 and 9 relate to one factor and sum of addition as it is explained by way of an example for every set and can be found in continuation of this description.

Set R, which is provided to carry out equation of type $R^2=a^2+b^2$ known as Pythagorian equation, has one non-movable disc R1$a$ with ordinary scale R11$a$, square scale R11$aa$, hairline R3$a$, reference box R4$a$, all drawn on back side of plate 01 and two real discs R1$b$ and R1$c$. Disk R1$b$ has square logarithmic scale and tab R2$b$ with reference hairline R3$b$ at index 10 of scale R11$b$. Disc R1$c$ is provided with reference line R3$c$ and will be referred to as searcher disc. All discs R1$a$, R1$b$ and R1$c$ have aligned central openings R5$a$, $b$, $c$ and pivot-pin R6. Opening R5$a$ coincides with opening 15$d$ of plate 01, while pivot-pin R6 is the continuation of pivot-pin 16. Two arrows shown at set R relate to one factor and sum of addition as it is explained in continuation by means of an example.

Referring again to the drawing FIGURE 1 with logarithmic scales 11$a$ . . . 51$a$ and 11$b$ . . . 51$b$, the novel slide rule is used for solution of polynomial equation in $x$. To solve for example an equation of fifth degree by means of five pairs of scales "$a$" and "$b$" as shown, consider equation:

$$x^5-3x^4-47x^3+27x^2+622x+840=0$$

This equation as known is a particular case of a general equation of fifth degree which can be expressed as:

$$x^5+p_5x^4+s_5x^3+t_5x^2+u_5x+q_5=0$$

where $-p_5$ is the sum of five roots $x_1$, $x_2$, $x_3$, $x_4$ and $x_5$ which equals $+3$, $q_5$ is the product of the same roots and equals 840, while $s_5$, $t_5$ and $u_5$ are coefficients which equal $-47$, $+27$ and $+622$ respectively as given in the particular equation.

Before proceeding to the work with the novel slide rule it will be of certain use to divide both sides of given equation by $x^2$ getting new form of equation with diminished values of $x$ and rearranged as follows:

$$x^3-3x^2-47x+622/x+840/x^2=-27$$

or generally:

$$x^3+p_5x^2+s_5x+u_5/x+q_5/x^2=-t_5$$

To start working on the novel slide rule certain value of $x$ has to be chosen, no matter which one. If so chosen value is wrong, then the sum of all terms of the given equation will not be equal $-27$ as given. Consider now solution of the equation with $x=5$, which will be referred to as root $x_5$. Align, by hand or by a bar similar to bar 02, all hairlines 13$b$, 23$b$, 33$b$, 43$b$ and 53$b$ in corresponding tabs "$b$" of discs 1$b$, 2$b$, 3$b$, 4$b$ and 5$b$ with middle line LL of plate 01. Then, holding all discs "$b$" in the obtained position by hand or by said bar to prevent their rotation, align by hand or by bar 02 all hairlines 13$c$, 23$c$, 33$c$, 43$c$ and 53$c$ of searcher discs 1$c$, 2$c$, 3$c$, 4$c$ and 5$c$ with numbers 5 of corresponding scales 11$b$ . . . 51$b$. In next step rotate one by one discs "$a$" to put in alignment coefficient of every term with 5 of corresponding disc "$b$," still holding all 5 discs in the same position by said bar as shown. A term such as $x^3$ is said to have coefficient 1. So align now index 1 of scale 11$a$ with 5 of scale 11$b$, number 3 of scale 21$a$ with 5 of scale 21$b$, number 47 of scale 31$a$ with 5 of scale 31$b$, number 622 of scale 41$a$ with 5 of scale 41$b$ and number 840 of scale 51$a$ with 5 of scale 51$b$. All results now appear in reading tabs "$b$" on line LL. It is understood to be known how to read place-value of every result on ordinary, square and cubic scales. Supply shown results with plus and minus signs taking them for positive root $x_5=5$ directly from the equation. It will be:

$$125-75-235+124.4+33.6=-27$$

The equality of the left-hand and right-hand sides of the equation is a proof that root $x_5=5$ satisfies given equation.

As described each one of the five roots of the given equation can be found. To do it easier and more quickly keep every "$a$" disc from moving, fastening them to plate in shown position, for example by means of paperclips (not shown). Then proceed as follows. Rotate all five discs 1$b$ . . . 5$b$ simultaneously using one bar for their rotation and hold all five searcher discs 1$c$ . . . 5$c$ in shown position by means of bar 02. Then number 5 of scales "$b$" will be changed on one other but the same number on scales "$b$." The set of scales "$b$" by means of hairlines "$c$" will be shown in alignment with the same given coefficients as it is shown on scales "$a$" for number 5. The reading tabs 12$b$ . . . 52$b$ will be all shifted on the same angle from middle line LL of plate 01 showing new results for every term of the equation. The user of the novel slide rule will learn very soon to quickly add the last digits as soon as possible to get $-7$ the last digit of given $-27$. Then the user will realize also that the difference between both sides of one equation will first increase slowly then decrease slowly until it becomes 0 and new root discovered. If said difference increases fast, no root to be expected. Some of roots will negative, in which case plus and minus signs will be changed only at terms having odd exponents as for example at terms $x$ and $x^3$. In such a case the sequence of shown signs will be $-$, $-$, $+$, $-$, $+$. The roots $x_4$, $x_3$, $x_2$ and $x_1$ which are $+7$, $-4$, $-3$ and $-2$ (not shown) can be easily demonstrated on in a similar manner as root $x_5=5$.

In some cases the obtained result is not precise enough and has to be rechecked on some other way. This is also provided at novel slide rule.

Referring now to the drawings FIGURE 2 and FIGURE 3, the root $x_5=5$ will be checked at given equation of fifth degree $$x^5-3x^4-47x^3+27x^2+622x+840=0$$

The checking will be performed by elimination root 5 from every term of given equation, getting a new equation of fourth degree as shown. The procedure is the following. Align reference hairlines 63$c$, 73$c$, 83$c$ and 93$c$ of searcher discs 6$c$, 7$c$, 8$c$ and 9$c$ with corresponding numbers 5 of scales 61$a$, 71$a$, 81$a$ and 91$a$ respectively using bar 02 or alike for synchronous rotation of said four discs "$c$." Hold discs "$c$" in obtained position by means of the same bar and rotate now one by one discs "$b$." Align 840 of scale 61$b$ with 5 of scale 61$a$. Read the quotient of division 840/5 on line 63$a$ in box 64$a$, which is 168, as shown. Add now next coefficient 622 to 168 which equals 790. This addition is also shown on logarithmic scales 61$a$ and 61$b$. The distance between numbers 168 and 622 in logarithmic units amounts 3.7 (scale 61$a$) in alignment with 622 of scale 61$b$ (see arrow). Add $+1$ to 3.7 getting 4.7. Read opposite to 4.7 of scale 61$a$ the sum 790 on scale 61$b$ (see other arrow).

Now align number 5 of scale 71$a$ with number 790 of scale 71$b$, rotating scale 71$b$, and holding discs "$c$" in obtained position. Read the quotient of division 790/5 on line 73$a$, box 64$a$. It amounts to 158 as shown. Add next coefficient 27 to 158 what equals 185. Show this addition on scales 71$a$ and 71$b$, defining distance between 158 and 270 (caution, it is not 27) of scale 71$b$ with logarithmic units of scale 71$b$. It amounts approximately 1.7 at 270 (see arrow). Diminish ten times this amount for addition of 158 and 27 getting .17. Add now $+1$ to .17 getting 1.17. Read opposite to 1.17 of scale 71$a$ the sum 185 on scale 71$b$ (see corresponding arrow).

Now align number 185 of scale 81$b$ with number 5 of scale 81$a$, moving scale "$b$" and holding scale "$c$" in shown position. Read the division of 185/5 as 37 of scale 81$b$ aligned with line 83$a$, box 84$a$. Add next coefficient $-47$ of given equation to 37. Get $-10$. Show this addition (subtraction) on scales 81*a* and 81*b* defining distance between 37 and 47 (caution, it is not −47) of scale 81*b* in logarithmic units of scale 81*a*. Get 1.27. Having difference instead of a sum subtract 1 from 1.27 obtaining .27. Multiply .27 times 10 which equals 2.7. Read opposite to 2.7 of scale 81*a* the difference 10 of scale 81*a* (see corresponding arrows for 2.7 and 1.27).

Now align number 10 (it is 10) of scale 91*b* with number 5 of scale 91*a*, moving scale "*b*" and holding scale "c" in obtained position. Read the division of −10/5 as −2 (shown 2) on line 93*a*, box 94*a*. Add next coefficient −3 to −2. Get −5. Show this addition on scales 91*a* and 91*b* defining distance between −2 and −3 (scale 91*b*) as 1.5 in logarithmic units (scale 91*a*). Add plus 1 to 1.5 obtaining 2.5. Read in opposition to 2.5 of scale 91*a* the sum 10 as −10 for negative numbers (see arrows at 1.5 and 2.5). This satisfies the equation, because −5/5 is −1 what with next coefficient +1 make 0. The root $x_5$ on this way is eliminated, creating new equation of fourth degree with new coefficients for every term of equation as shown on lines 61*a*, 71*a*, 81*a* and 91*a*, so the new equation is:

$$x^4+2x^3-37x^2-158x-168=0$$

It is properly to be noted that every coefficient (numercial value) changed its sign from what was shown at checking of the equation. In general terms this equation is:

$$x^4+p_4x^3+s_4x^2+t_4x+s=0$$

The root $x_4$ can be found from this equation and then eliminated from it getting new cubic equation of general form:

$$x^3+p_3x^2+s_3x+q_3=0$$

The root $x_3$ can be found from the obtained cubic equation, which again can be transformed in new square equation:

$$x^2+p_2x+q_2=0$$

It is apparent, that performing of the equation of diminished degree on the novel slide rule demands less and less sets to be engaged, dealing in the same time with smaller numbers. How simple it can be for a square equation, consider a problem to find roots $x_1$ and $x_2$, having equation:

$$x^2+52x+235=0$$

Referring now to the drawing FIGURE 1 set *x*, put reference line 33*b* in alignment with number 235 of scale 31*a*. Move now searcher disc 3*c* back and forth until by means of reference hairline 33*c* two opposite numbers are found, whose sum is 52. Those numbers are 47 and 5 as shown. Having positive term *x* and positive constant term 235 roots $x_1$ and $x_2$ will be negative as known.

Referring now again to the drawings FIGURES 2 and 3, consider a problem to solve an equation, having imaginary roots, as shown on scales R11*a* (R11*aa*) and R11*b*:

$$x^2-6x+25=0$$

This equation may be both independent and the rest of an equation of a higher degree after other real roots are found. No real roots can be found for this equation, but the rule, that $-p$ is the sum of roots $x_1$ and $x_2$ and $q$ is the product of $x_1$ and $x_2$ will be applied now to the complex roots known as $a+bi$ and $a-bi$. Their sum is $2a$, their product is as known $$(a+bi)\ (a-bi)=a^2+b^2$$

This is expressed on the drawing FIGURE 2 as $$R^2=a^2+b^2$$

where R has the same meaning as product $q$. So $2a=6$, $a=3$ and $R^2=25$ as given. To find now value of $b$ put 3 of scale R11*a* in alignment with reference hairline R3*b* in tab R2*b*, rotating disc R1*b* because disc R1*a* is drawn on plate 01. Put 25($R^2$) of scale R11*aa*, which equals 5(R) on scale R11*a*, in alignment with reference hairline R3*c* of disc R1*c*. Read now distance between 3 and 5 of scale R11*a* in logarithmic units as 27.8. Subtract 10 from 27.8, obtaining 17.8. Opposite to 17.8 read 4 on scale R11*b*, which is *b*. Now complex roots are known, they are $3+4i$ and $3-4i$. Their sum is $-p_1=3+4i+3-4i=6$, their product $$q_1=(3+4i)\ (3-4i)=25$$

Set R can be used for rectangle and triangle, as well, finding out one side if two others are known (squaring will be avoided). In the same time other calculations are shown on the same scales R11*a* and R11*b*. For example, division of 10 by $3^2$ (see reference hairline R3*b*) or division of 27.8 by $5^2$ (see reference hairline R3*c*) is 1.11 as shown on scale R11*b* in alignment with line R3*a* in box R4*a*. Some other calculations can also be shown on other sets, particularly on sets $x^3$ and $x^2$ what only makes the novel slide rule more attractive.

Having thus described my invention, I claim:

1. A slide rule calculator comprising a plurality of circular slide rules mounted on a common base, wherein the axis of each said slide rule, falls on a straight line, and wherein each slide rule comprises a plurality of circular discs of decreasing diameter mounted on a common axis, the largest disc being mounted closest to the base, with the discs of smaller diameter superimposed concentrically thereover, each slide rule including a searcher tab mounted over the said discs, and about the same axis wherein said tab is provided with a hairline for aligning predetermined portions of the concentric discs, each of said discs being provided with logarithmic scales, and wherein at least one scale on one of the said slide rules, has a logarithmic scale in a reverse direction than on the other slide rules, one of said discs including an index tab with a hairline to align the said disc with a specific predetermined portion of the scale on the adjoining concentric disc in combination with means joining the searcher tab on all the slide rules, so that all searcher tabs can be set simultaneously upon the setting of one of the searcher tabs, thereby coordinating the functioning of all the slide rules into one calculating unit facilitating the necessary computations to ascertain the roots of equations of varying degrees.

2. A slide rule calculator as in claim 1, wherein the said means comprises holes provided in the searcher tabs along a radial line equidistant from the centers of the axis of each of the slide rules, in combination with a rod having a plurality of pegs adapted to be inserted into each of said holes, whereby movement of any one of the searcher tabs will cause all of the searcher tabs to be moved simultaneously, due to the rod, and furthermore permitting the searcher tabs to move rotatably with respect to the said pegs.

References Cited by the Examiner

UNITED STATES PATENTS

| | | | |
|---|---|---|---|
| 2,871,582 | 2/1959 | Frank | 235—84 X |
| 3,071,321 | 1/1963 | Ezopov | 235—84 |

FOREIGN PATENTS

| | | |
|---|---|---|
| 539,305 | 9/1941 | Great Britain. |

RICHARD B. WILKINSON, *Primary Examiner.*

LEO SMILOW, LOUIS J. CAPOZI, *Examiners.*

C. G. COVELL, JAMES G. MURRAY, *Assistant Examiners.*